(12) United States Patent
Satoh

(10) Patent No.: US 8,153,097 B2
(45) Date of Patent: Apr. 10, 2012

(54) METHOD FOR MANUFACTURING FERRITE POWDER, FERRITE POWDER, AND MAGNETIC RECORDING MEDIUM

(75) Inventor: Mamoru Satoh, Tokyo (JP)

(73) Assignee: TDK Corporation, Tokyo (JP)

( * ) Notice: Subject to any disclaimer, the term of this patent is extended or adjusted under 35 U.S.C. 154(b) by 714 days.

(21) Appl. No.: 12/237,962

(22) Filed: Sep. 25, 2008

(65) Prior Publication Data

US 2009/0087658 A1     Apr. 2, 2009

(30) Foreign Application Priority Data

Oct. 2, 2007   (JP) .................................. 2007-258368

(51) Int. Cl.
   *C04B 35/00*   (2006.01)
(52) U.S. Cl. ............... 423/594.1; 423/594.2; 252/62.56; 252/62.57; 252/62.58; 252/62.59; 252/62.62; 252/62.63; 252/62.64
(58) Field of Classification Search .... 252/62.56–62.59, 252/62.62–62.64; 423/594.1, 594.2; 209/10, 209/11

See application file for complete search history.

(56) References Cited

U.S. PATENT DOCUMENTS

| | | | | |
|---|---|---|---|---|
| 3,634,254 A | * | 1/1972 | Micheli ........................ | 252/62.63 |
| 4,025,449 A | * | 5/1977 | Pezzoli et al. .............. | 252/62.63 |
| 4,675,170 A | * | 6/1987 | Hibst et al. ................. | 423/594.2 |
| 4,690,768 A | * | 9/1987 | Kamiyama ................ | 252/62.58 |

FOREIGN PATENT DOCUMENTS

| | | | |
|---|---|---|---|
| CN | 1208020 A | * | 2/1999 |
| JP | B2-61-029888 | | 7/1986 |
| JP | B2-62-017841 | | 4/1987 |
| JP | A-2001-284112 | | 10/2001 |
| JP | A-2003-139469 | | 5/2003 |

* cited by examiner

*Primary Examiner* — Steven Bos
(74) *Attorney, Agent, or Firm* — Oliff & Berridge, PLC

(57) ABSTRACT

A method for manufacturing ferrite powder comprises a step (a) of causing a precursor, obtained by a liquid-phase reaction method, to pass through a sieve with openings of 2 mm or less, and a step (b) of causing free fall, through the interior of a furnace tube heated to the range 750 to 1250° C. by a heater, of the precursor which has passed through the sieve. In the process of causing free fall through the interior of the furnace tube heated by the heater, ferrite powder, which is a single phase of hexagonal ferrite, is obtained by heating the precursor to a prescribed temperature and holding the precursor at the prescribed temperature.

4 Claims, 1 Drawing Sheet

METHOD FOR MANUFACTURING FERRITE POWDER, FERRITE POWDER, AND MAGNETIC RECORDING MEDIUM

BACKGROUND OF THE INVENTION

1. Field of the Invention

This invention relates to a method for manufacturing ferrite powder used in ferrite cores, ferrite magnets, electromagnetic wave absorption members, magnetic recording media, and similar, and in particular relates to a method for manufacturing ferrite powder with fine particles.

2. Related Background Art

Liquid-phase reaction methods and vapor-phase methods are known as methods of manufacture of ferrite powder in which fine particles are obtained.

In general solid-phase reaction methods, first compounds serving as starting materials such as oxides, hydrides, carbides, and similar are mixed so as to obtain a prescribed composition. This mixture is placed in a ceramic or metal tray, and is heated to a prescribed temperature at a slow rate, such as for example 5° C./minute or less, in an air atmosphere or in a gas atmosphere at atmospheric pressure. Then, by performing heat treatment in which the material is held for 2 to 8 hours at 1000 to 1300° C., the starting materials are caused to react with each other (ferrite synthesis reaction), to obtain the desired ferrite powder. The ferrite powder thus obtained is crushed as necessary. Further, by performing heat treatment any strain occurring due to crushing can be removed (see for example Japanese Patent Laid-open No. S62-17841).

Solid-phase reactions entail heat treatment performed for approximately 2 to 8 hours, so that grain grown occurs simultaneously with the ferrite synthesis reaction. Hence the ferrite powder obtained by solid-phase reactions has comparatively large grain diameters, typically of micron order.

In a vapor-phase method, first organometallic complexes and other starting materials are heated, and converted into a gas or nearly-gaseous state. Then, the heated starting materials are transported to a reactor using a carrier gas or other means. And, the starting materials are decomposed by heat, or using laser light, ultraviolet rays, plasma, or other energy, to synthesize ferrite powder. Extremely fine powder can be obtained from vapor-phase methods, but the granularity distribution is broad, and the amounts synthesized are small, so that such methods are applied when producing expensive materials, and are not generally used as methods to produce fine and comparatively inexpensive powders such as ferrite.

Ferrite powder obtained by liquid-phase reaction methods has small particle sizes compared with ferrite powder obtained from solid-phase reaction methods. Coprecipitation methods and organic salt methods are well-known as liquid-phase methods.

In a coprecipitation method, first, a solution of a metal salt containing the metal to form the ferrite, and sodium hydroxide, potassium hydroxide, or another alkali metal hydroxide, are made to react chemically, to prepare a precipitate (precursor) comprising an oxide or hydroxide. This precipitate can be subjected to heat treatment (ferrite synthesis reaction), to synthesize fine-particle ferrite powder (see for example Japanese Patent Laid-open No. S61-29888). However, although fine particles can be obtained as a precursor by the coprecipitation method, the ferrite synthesis reaction is accompanied by grain growth. Hence it has been difficult to obtain ferrite powder with primary particles of size 200 nm or less, for example.

In an organic salt method, first citric acid, oxalic acid, or another organic acid is added to an aqueous solution of a metal salt containing the metal forming the ferrite, the solution is heated, a reaction is driven in the liquid phase, and an organic acid complex (precursor) is prepared. By subjecting this complex to heat treatment (ferrite synthesis reaction), a fine-particle ferrite powder can be synthesized. However, similarly to the coprecipitation method, during the heat treatment to drive the ferrite synthesis reaction, unnecessary grain growth occurs.

In order to perform heat treatment and drive the ferrite synthesis reaction without inducing grain growth of the fine precursor obtained by a liquid-phase reaction method, the precursor must be heated rapidly.

As a methods realize this rapid heating, high-frequency inductive heating using a heating coil, and an infrared heating furnace (Japanese Patent Laid-open No. 2001-284112) are known. However, these methods require a container to hold the starting material composition (processed material). Hence there are concerns of problems arising from the occurrence of difference phases due to reactions of processed material with the container, and from declines in cooling speed due to the thermal capacity of the container and of resulting grain growth. Further, because in these methods the processed material is placed at rest and heat treatment performed, the amount processed in one cycle is limited, so that there is the drawback that such methods are not suited to mass production.

Another method to realize rapid heating is disclosed in Japanese Patent Laid-open No. 2003-139469. The method of Japanese Patent Laid-open No. 2003-139469 is a heat treatment method in which the processed material is heated to a prescribed temperature, and after holding the processed material at that temperature for a prescribed time, is cooled. In this heat treatment method, while subjecting the processed material to free fall in vacuum, by heating the processed material during free fall from the surroundings, the processed material is heated to the prescribed temperature.

However, although in the method of Japanese Patent Laid-open No. 2003-139469 heating to a prescribed temperature is performed while causing free fall in vacuum, processing to maintain the prescribed temperature for the prescribed time is performed on a rotating drum (see FIG. 1 of Japanese Patent Laid-open No. 2003-139469). When, in such a method, ferrite powder is obtained from a precursor, the precursor, heated to the temperature at which the ferrite synthesis reaction occurs, falls onto and collides with the rotating drum. Hence the particles forming the precursor are compacted together. Further, because the material is held for a comparatively long time on the rotating drum, there are concerns that grain growth and strong agglomeration may occur. Further, in order to withstand sustained high temperatures, the rotating drum must be formed from a material which does not readily react with the processed material, and to which there is little adhesion. And, even when the rotating drum is formed from such material, considering processing over long periods of time and repetition of processing any number of times, it is undeniable that small amounts of processed material remain on the rotating drum. Hence it is easily inferred that the remaining processed material may become nuclei to promote grain growth and sintering of processed material.

SUMMARY OF THE INVENTION

This invention was devised based on the above technical problems, and has as an object the provision of a method for manufacturing ferrite powder in which the appearance of different phases is adequately suppressed, while suppressing grain growth of the precursor of fine particles obtained from a liquid-phase reaction method.

Given this object, a method for manufacturing ferrite powder of this invention comprises a step (a) of causing a precursor, obtained by a liquid-phase reaction method, to pass through a sieve with openings of 2 mm or less, and a step (b) of causing free fall, through a space at normal pressure heated from the surroundings to 750 to 1250° C., of precursor which has passed through the sieve, wherein in step (b), ferrite powder, which is a single phase of hexagonal ferrite, is obtained by heating the precursor to a prescribed temperature and holding the precursor at the prescribed temperature.

It is preferable that the average particle diameter of primary particles of the ferrite powder obtained in this invention is 200 nm or less.

To this end, it is preferable that the average particle diameter of primary particles forming the precursor is 100 nm or less.

Further, in a method of this invention, it is preferable that an airflow in the direction of free fall of the precursor be generated.

According to this invention, a step is provided in which precursor which has been passed through a sieve is subjected to free fall through space at normal temperature and heated to 750 to 1250° C., and in this step, by heating the precursor to a prescribed temperature and moreover holding the precursor at the prescribed temperature, ferrite powder is obtained. In this step, the precursor is rapidly heated, so that ferrite synthesis is completed rapidly. By halting the heating when the ferrite synthesis reaction is completed, grain growth can be suppressed, and ferrite powder which is a single phase of hexagonal ferrite can be obtained.

This invention further provides ferrite powder manufactured by a method described above, and provides a magnetic recording medium which uses this ferrite powder.

DESCRIPTION OF THE PREFERRED EMBODIMENTS

Figure 1:
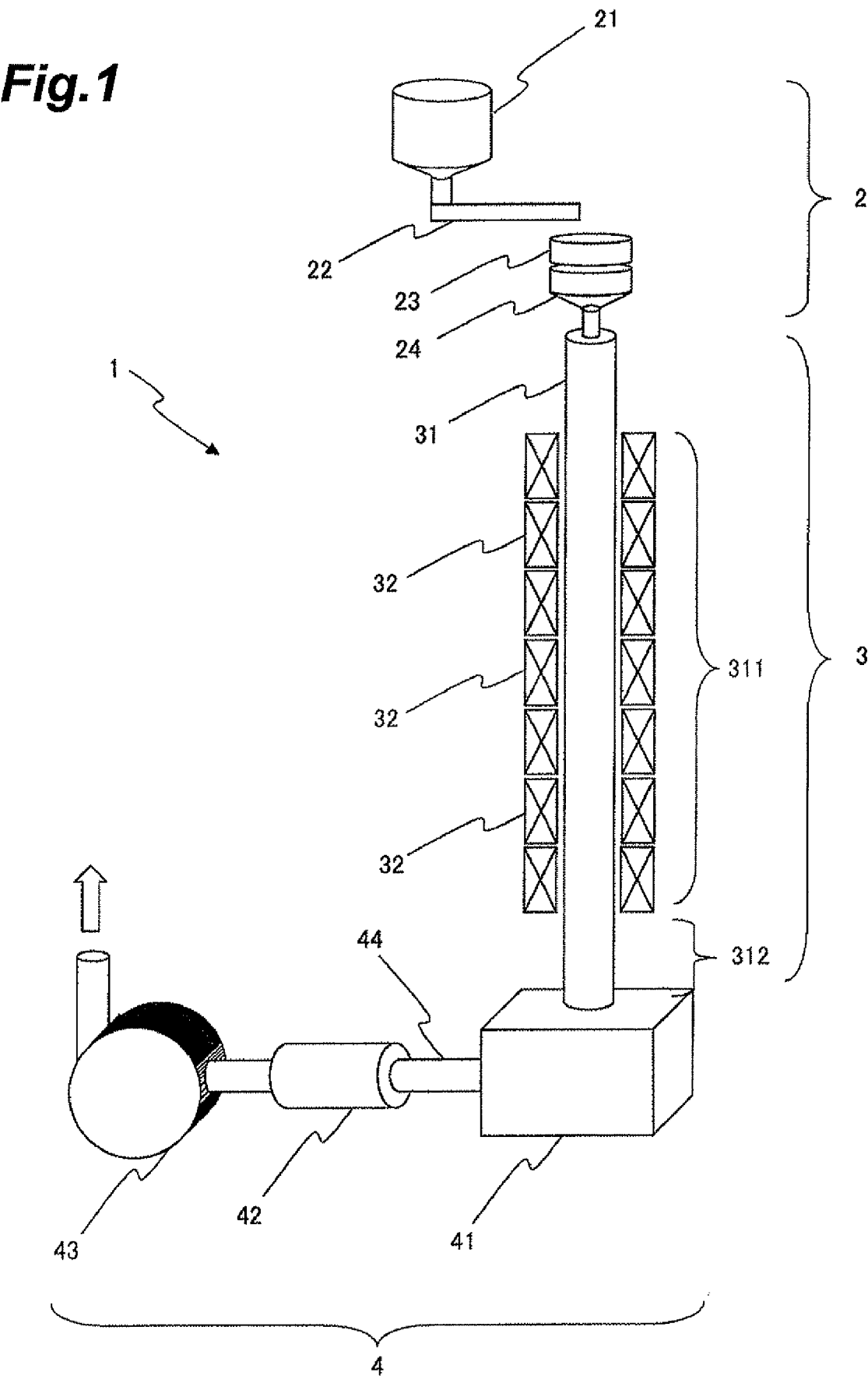
FIG. 1 is a perspective view showing in summary the configuration of a heat treatment device which can be used in this invention.

Below, the invention is explained in detail based on aspects.

<Precursor>

This invention employs a ferrite precursor (hereafter simply called "precursor") obtained by a liquid-phase reaction method.

As explained above, a coprecipitation method and an organic salt method can be used as the liquid-phase reaction method.

The starting raw materials of the liquid-phase reaction method comprise a metal compound containing metal forming the ferrite, and another compound added together with this metal compound. This metal compound can be used in common with an organic salt method and with a coprecipitation method.

The metal compound containing metal forming the ferrite comprises an iron compound and another metal compound. As the iron compound, for example, iron nitrate ($Fe(NO_3)_3$), iron sulfate ($Fe_2(SO_4)_3$), iron chloride ($FeCl_3$), or another water-soluble iron salt having trivalent iron can be used.

Further, the other metal compound is selected appropriately according to the desired ferrite composition. For example, when synthesizing an M-type (magnetoplumbite-type) ferrite powder, as the other metal compound, strontium nitrate ($Sr(NO_3)_2$), barium nitrate ($Ba(NO_3)_2$), or another water-soluble metal salt can be used. As the other metal compound, a metal salt containing a rare earth metal element, and a metal salt containing Co or Zn, can also be used as necessary.

The organic salt method can use, as the other compound, citric acid, oxalic acid, or another organic acid having the ability to form a complex with metal ions. Among these, citric acid is appropriate. The precursor obtained by the organic salt method is subjected to heat treatment of the metal forming hexagonal ferrite and the organic salt to decompose the organic component and decarbonizing, to obtain powder.

The coprecipitation method can use, as the other compound, an alkaline compound as a precipitant. As alkaline compounds, sodium hydroxide (NaOH), potassium hydroxide (KOH), and other alkali hydroxides, as well as ammonia ($NH_3$), can be used. Of these, sodium hydroxide and ammonia are appropriate. In the process of precipitation, ammonium hydroxide ($NH_4OH$) and other ammonium salts are produced. The precursor obtained by a precipitation method contains at least one among an oxide and a hydroxide, and the oxide and hydroxide contain metal forming the hexagonal ferrite.

In a liquid-phase reaction method, a plurality of metal compounds containing metal forming the ferrite are dissolved in water and mixed, to prepare an aqueous solution. Then, another compound is added and mixed, to prepare the precursor.

It is preferable that the average particle diameter of primary particles forming a precursor obtained by a liquid-phase reaction method is 100 nm or less. This is in order to ensure that the average particle diameter of the primary particles of the ferrite powder obtained by heat treatment is 200 nm or less. It is preferable that the average particle diameter of primary particles is 50 nm or less, and still more preferable that the average particle diameter is 40 nm or less. No limitations in particular are placed on the lower-limit value, but values of 5 nm or greater are practical. This invention can drive a ferrite synthesis reaction while suppressing grain growth of such a fine-particle precursor. The precursor can also be granulated and provided for heat treatment.

<Heat Treatment>

Precursor obtained by a liquid-phase reaction method is subjected to heat treatment in order to cause a ferrite synthesis reaction. By means of this heat treatment, the ferrite synthesis reaction occurs instantaneously. By this means, grain growth of the ferrite particles produced can be suppressed.

Heat treatment in the invention causes completion of the ferrite synthesis reaction in a process in which the precursor is in free fall through a space at normal pressure. Hence heat treatment of this invention is performed in a process in which the precursor is in free fall through a space at normal pressure. It is preferable that the heating temperature be 750 to 1250° C. If the temperature is under 750° C., the ferrite synthesis reaction does not occur adequately, and different phases are produced. On the other hand, if the temperature exceeds 1250° C., grain growth in the ferrite powder cannot be ignored. A prescribed heat treatment time is necessary until the ferrite synthesis reaction is completed. This heat treatment time can be said to be proportional to the free-fall distance of the precursor.

However, in a method in which heat treatment is performed in vacuum, it is not easy to secure the free-fall distance necessary to complete the ferrite synthesis reaction. This is because of the limitations on increases in the size of a heat treatment device comprising a mechanism to maintain a vacuum, from the standpoint of maintaining a vacuum, and considering costs as well. This is thought to be the reason why, in Japanese Patent Laid-open No. 2003-139469, heat treatment of the processed material during natural free-fall in vacuum is limited to processes of heating to a prescribed temperature, and treatment to maintain the prescribed temperature is performed on a rotating drum.

By means of this invention, in which a precursor is subjected to free fall under normal pressure, securing the distance necessary to complete the ferrite synthesis reaction is much easier than when using a method employing a heat treatment device having a vacuum mechanism.

As explained above, the precursor obtained in the liquid-phase reaction method has fine primary particles of size 100 nm or less. However, agglomeration of these primary particles in the stage of their production, and in the subsequent handling process, is unavoidable. According to studies by these inventors, as the size of precursor agglomerates increases, the ferrite synthesis reaction does not proceed in portions within the agglomerates, and so phenomena have been observed in which phases other than the desired hexagonal ferrite phase (for example, a spinel ferrite phase) are also produced. The reason for this is thought to be that the required heat is not supplied to the center portion compared with the peripheral portion of the agglomerate. As the amount of heat supplied to the center portion is increased, grain growth of the precursor existing in the peripheral portion occurs.

Hence in this invention, the maximum diameter of the precursor (agglomerate) is restricted to 2 mm or less, so as not to comprise coarse agglomerate in the precursor prior to heat treatment. To this end, a sieve is used, and the precursor, after passing through the sieve, is subjected to the above-described heat treatment. The openings in the sieve used are 2 mm or less. From the standpoint of adequately suppressing the occurrence of other phases, it is preferable that the sieve openings are 1 mm or less, and it is still more preferable that the openings are 0.5 mm or less. Secondary particle diameters may be made 2 mm or less through granulation.

FIG. 1 is a summary configuration view showing one example of a heat treatment device 1 which executes heat treatment of this invention.

The heat treatment device 1 comprises a supply portion 2; heating treatment portion 3, which heats precursor supplied from the supply portion 2 and causes the ferrite synthesis reaction; and collection portion 4, which collects ferrite powder produced by the heating treatment portion 3.

The supply portion 2 comprises a hopper 21 which holds a prescribed quantity of precursor. Precursor loaded into the hopper 21 is transported via the starting material supply path 22 to arrive at the sieve 23. A vibration feeder or other well-known transport means may be adopted for transport of precursor in the starting material supply path 22. The sieve 23 is provided to remove coarse agglomerate and supply precursor to the heat treatment portion 3 which is the next process. Openings in the sieve 23 are 2 mm or less; it is preferable that the openings are 1 mm or less, and still more preferable that the openings are 0.5 mm or less. A fixed-type sieve can be used as the sieve 23, but a vibrating sieve can also be used. By using a vibrating sieve, precursor can easily pass through the sieve 23. Also, agglomerate in sizes exceeding the openings can be crushed to enable passage through the sieve 23.

Further, in order to perform crushing more easily, a ball of diameter 3 mm or greater may be placed on the sieve 23. And, in order to forcibly cause the precursor to pass through the sieve 23, a brush may be moved automatically or may be built into the device. Having passed through the sieve 23, the precursor is supplied via a funnel 24 to the heating treatment portion 3. Precursor which has passed trough the sieve 23 may make contact with the funnel 24, but precursor particles do not make mutual contact in the process of being supplied to the heating treatment portion 3. Hence having passed through the sieve 23, precursor is supplied to the heating treatment portion 3 without a reoccurrence of agglomeration.

The heating treatment portion 3 comprises a furnace tube 31 and a plurality of heaters 32 surrounding the furnace tube 31. The furnace tube 31 is a cylindrical member comprising a heat-resistant material such as mullite, arranged with length direction in the vertical direction. Precursor which has passed through the funnel 24 falls freely in the hollow portion of the furnace tube 31. The furnace tube 31 is heated by the heaters 32 to a prescribed temperature, so that the free-falling precursor is heated by radiant heat from the inner wall of the furnace tube 31, and is rapidly and uniformly heated. Moreover, the precursor is directly heated by radiant heat, so that compared with being held in a container and heating, energy efficiency is high. The heating treatment portion 3 comprises a plurality of heaters 32, and by controlling the temperatures of each of the heaters 32, a temperature gradient can be maintained at different positions in the vertical direction. Of course, all of the heaters 32 can be set to the same temperature as well.

Here, if the length in the vertical direction of the portion of the furnace tube 31 along which the heaters 32 are positioned (the heating/maintenance region 311) is the effective furnace length, then it is preferable that the effective furnace length be 3 m or greater. This is in order to heat the precursor over the time necessary to cause the ferrite synthesis reaction.

As explained above, heating by the heaters 32 is in the temperature range from 750 to 1250° C. The pressure within the furnace tube 31 is normal pressure, and the atmosphere therein may be an air atmosphere. Or, an inert gas can be supplied to make the atmosphere an inert atmosphere. The interior of the furnace tube 31 of the heat treatment device 1 need not be kept in vacuum, so that the length of the furnace tube 31 can be made long with relative ease. For example, the effective furnace length can for example be made 20 m. However, when the interior of the furnace tube 31 is at normal pressure, and moreover is heated to the above-described temperature range, there are concerns that an upward air flow may occur within the furnace tube 31. In order to suppress this upward air flow, it is preferable that an air flow directed in the direction of free fall of the precursor be induced within the furnace tube 31. By adjusting the flow rate of this air flow, the free fall velocity of the precursor can be controlled. As explained below, by providing an exhaust device 43 in the heat treatment device 1, an air flow in the direction of precursor free fall can be induced within the furnace tube 31.

The heating treatment portion 3 comprises a heating/maintenance region 311 in which heaters 32 are positioned, and a cooling region 312, in the lower-end portion of the furnace tube 31, in which no heaters 32 are positioned. In the process in which the precursor passes through the heating/maintenance region 311, heated by the heaters 32, the ferrite synthesis reaction is completed. By adjusting the heating temperature of the heaters 32 and the time in which the precursor passes through the heating/maintenance region 311, the ferrite synthesis reaction can be driven to completion, and moreover grain growth can be suppressed.

Through movement of the ferrite powder thus obtained into the cooling region 312, the ferrite powder is cooled in the process of free fall, and grain growth is suppressed. In the cooling region 312, the ferrite powder does not make contact with other members, so that cooling is performed relatively easily.

The collection portion 4 comprises a powder collection portion 41, cooler 42, and exhaust device 43. The powder collection portion 41 connected to the furnace tube 31 comprises a container which collects ferrite powder which has passed through the furnace tube 31. This container can be formed from a heat-resistant metal. The powder collection portion 41 is connected via a suction tube 44 to the exhaust device 43. By operation of the exhaust device 43, an air flow is induced in the direction of free fall of precursor in the furnace tube 31.

The cooler 42 is provided on the outer periphery of the suction tube 44, between the powder collection portion 41 and the exhaust device 43; gas which has passed through the powder collection portion 41 is cooled within this cooler 42 before being exhausted to the outside by the exhaust device 43. The cooler 42 can for example be a device comprising a water-cooled jacket.

When performing heat treatment of the precursor using the heat treatment device 1 described above, the ferrite synthesis reaction is completed in the process of free fall of the precursor in the furnace tube 31. To this end, it is necessary to adjust the heating temperature within the furnace tube 31 and the time during which the precursor is heated at this heating temperature. The heating temperature within the furnace tube 31 can be adjusted primarily by setting the heating temperatures of the heaters 32. The heating time can be controlled by adjusting the length of the effective furnace length in the furnace tube 31, or the exhaust flow (velocity) due to the exhaust device 43.

When a plurality of heaters 32 are provided, by selecting the heaters 32 which are made to operate, a gradient can be imparted to the heating temperature. In the example of FIG. 1, a method can be adopted in which a number of heaters 32 in the vertically upward higher portion are made to operate, but a number of heaters 32 in the vertically lower portion are made not to operate. Further, when implementing actual mass production, the optimal heating temperature and heating time can be confirmed experimentally, and these conditions adopted for production.

By using the heat treatment device 1, the ferrite synthesis reaction of the precursor is completed, and moreover cooling is performed until arrival at the powder collection portion 41, so that there is no mutual contact of ferrite particles at high temperatures. Hence in addition to during the ferrite synthesis reaction, there is also little agglomeration of ferrite particles after the reaction.

It is preferable that primary particles of the ferrite power obtained in this invention have on average a particle diameter of 200 nm or less. When used in high-density magnetic recording media, if particles have a diameter of 200 nm or greater, the short wavelengths accompanying high recording densities cannot be accommodated. Also, the surface of the magnetic recording media becomes rough, and spacing losses are increased. It is preferable that the average particle diameter of primary particles of the ferrite powder is 100 nm or less, and still more preferable that the average diameter is 50 nm or less.

The ferrite powder obtained in this invention has a single phase, which is a hexagonal ferrite phase. Hexagonal ferrites to which this invention can be applied include magnetoplumbite (M) type ferrite, and W type ferrite. In this invention, it is assumed that XRD is used to judge whether hexagonal ferrite is a single phase or comprises different phases.

Further, ferrite powder obtained in this invention has a coercivity (Hc) of 6000 Oe or lower, and a saturation magnetization ($\sigma s$) of 45 emu/g or higher. Hexagonal ferrite with a coercivity (Hc) of approximately 6000 Oe is easily obtained. When considering use in magnetic recording media, the upper limit to Hc enabling erasure and writing with current magnetic heads is 4000 Oe. Hence when the coercivity (Hc) exceeds 4000 Oe, a constituent element of ferrite must be replaced with another element to lower the coercivity (Hc). Also, when considering storage stability, the coercivity (Hc) should be 1200 Oe or higher, and more preferably 1500 Oe or higher. It is preferable that the saturation magnetization ($\sigma s$) be as high as possible, and equivalent to tape output; for hexagonal ferrite, which is an oxide with fine particles (particle diameters 20 to 40 nm), approximately 60 to 70 emu/g is regarded as the upper limit. When considering playback output, it is preferable that the saturation magnetization ($\sigma s$) be 45 emu/g or higher. As is clear from the examples described below, ferrite powder obtained in this invention can comprise the above-described magnetic characteristics.

Ferrite powder obtained by this invention can be applied in magnetic tape, magnetic cards, magnetic disks, and other well-known magnetic recording media.

For example, on magnetic tape, a lower non-magnetic layer and a magnetic layer are formed, in this order, on one side of base film Thus magnetic tape is configured so as to enable recording and playback of various recording data by a recording/playback device.

Also, on the other side of the base film, a back coat layer is formed to improve tape traveling performance and to prevent base film scratching (abrasion) and charge buildup on the magnetic tape. The structure of magnetic tape is not limited to this structure, and any well-known structure can be used.

<Magnetic Layer>

A magnetic layer is obtained by application of a magnetic coating. A magnetic coating has magnetic powder and a binder dispersed in a solvent; a well-known dispersant, lubricant, abrasive, hardening agent, antistatic agent, and similar may be added as necessary. As the magnetic powder, ferrite powder obtained by this invention can be used.

As the binder, a vinyl chloride copolymer, polyurethane resin, acrylic resin, polyester resin, or another heat-curing resin, as well as a radiation-curing resin, or another well-known material can be used.

<Lower Nonmagnetic Layer>

As the underlayer material, a material comprising a non-magnetic powder and a binder can be used. A dispersant, abrasive, lubricant, and similar can be added as necessary.

As the nonmagnetic powder, carbon black, $\alpha$-iron oxide, titanium oxide, calcium carbonate, $\alpha$-alumina, or another inorganic powder, or a mixture of these, can be used.

As the binder, dispersant, abrasive, or lubricant of the underlayer, dispersants, abrasives, and lubricants similar to those used in the magnetic coating can be employed.

<Back Coat Layer>

A well-known structure and composition can be used for the back coat layer. For example, a back coat layer containing carbon black or a nonmagnetic inorganic powder other than carbon black and a binder can be used.

<Manufacturing Method>

In this invention, no limitations in particular are placed on the method for manufacturing a magnetic recording medium, and a well-known magnetic recording medium manufacturing method can be used. For example, coatings can be fabricated by mixing, kneading, dispersing, and diluting materials, and the various layers can be formed by using well-known application methods to apply coatings onto a supporting member to form the lower nonmagnetic layer, magnetic layer, and back coat layer. Alignment, drying, and calendering treatment can be performed as necessary. After application, curing treatment is performed, and by cutting into the desired shape, or incorporating into a cartridge, a magnetic recording medium is manufactured.

EXAMPLES

Below, examples and comparison examples are used to give a more specific explanation of the content of the invention; however, the invention is not limited to the following examples.

Example 1

Iron nitrate ($Fe(NO_3)_3 \cdot 9H_2O$), strontium nitrate ($Sr(NO_3)_2$), lanthanum nitrate ($La(NO_3)_3 \cdot 6H_2O$), and cobalt nitrate ($Co(NO_3)_2 \cdot 6H_2O$) were weighed out so as to yield a chemical composition with Fe:Sr:La:Co=11.7:0.7:0.3:0.3 ($La_{0.3}Sr_{0.7}Co_{0.3}Fe_{11.7}O_x$; denoted by "LaCo" in Table 1 and 2). These starting materials were dissolved in ion exchange water such that the Fe concentration was 0.2 mol/L.

Next, this solution was mixed with a citric acid solution with a concentration of 10 mol %, such that the citric acid concentration was equivalent to five times the total molar concentration of metal ions. This mixture of solutions was heated at 80° C. for three hours, and then heated at 120° C. until gelling occurred. The gel obtained was dehydrated in a nitrogen gas flow at 120° C., and then a furnace in which the oxygen partial pressure could be controlled was used to perform decomposition of the organic materials at 300 to 600° C. Thereafter crushing was performed to fabricate the precursor.

The precursor thus obtained was subjected to heat treatment using the procedure described below, employing a heat treatment device 1 with the structure shown in FIG. 1.

With the openings in the sieve 23 at 2 mm, the precursor, having passed through the sieve 23, was directly, without being received by another container, subjected to free fall in the furnace tube 31, of effective furnace length approximately 7 m and with each of the heaters 32 set to the temperature 1000° C. in advance. Powder was collected by the powder collection portion 41. As explained above, the effective furnace length is the length in the vertical direction along which the heaters 32 are positioned. The exhaust device 43 was operated to cause an exhaust within the furnace tube 31 with an air flow of approximately 1 to 5 L/min (and similarly in the following Examples and comparison examples), inducing an air flow in the downward direction.

A VSM (Vibrating Sample Magnetometer) was used to measure the saturation magnetization ($\sigma s$) and coercivity (Hc) of the powder (ferrite powder) obtained. Also, XR (X-Ray Diffraction spectroscopy) was used to confirm the phases of the particles (ferrite powder) obtained, and TEM (Transmission Electron Microscope) was used to determine the sizes of particles obtained (precursor, ferrite powder). Results appear in Table 1.

Example 2

Powder was fabricated similarly to that of Example 1, except that the effective furnace length was approximately 3 m. The powder obtained was evaluated similarly to that of Example 1. Results appear in Table 1.

Example 3

Powder was fabricated similarly to that of Example 1, except that the effective furnace length was approximately 15 m. The powder obtained was evaluated similarly to that of Example 1. Results appear in Table 1.

Example 4

Powder was fabricated similarly to that of Example 1, except that openings in the sieve 23 were 0.2 mm. The powder obtained was evaluated similarly to that of Example 1. Results appear in Table 1.

Example 5

Powder was fabricated similarly to that of Example 1, except that the temperature setting of each of the heaters 32 was 800° C. The powder obtained was evaluated similarly to that of Example 1. Results appear in Table 1.

Example 6

Powder was fabricated similarly to that of Example 1, except that the temperature setting of each of the heaters 32 was 1200° C. The powder obtained was evaluated similarly to that of Example 1. Results appear in Table 1.

Example 7

Powder was fabricated similarly to that of Example 1, except that, as the starting materials, in place of cobalt nitrate ($Co(NO_3)_2 \cdot 6H_2O$), zinc nitrate ($Zn(NO_3)_2 \cdot 6H_2O$) was used, and the materials were prepared so as to obtain a chemical composition of Fe:Sr:La:Zn=11.7:0.7:0.3:0.3 ($La_{0.3}Sr_{0.7}Zn_{0.3}Fe_{11.7}O_x$, denoted by "LaZn" in Table 1 and 2). The powder obtained was evaluated similarly to that of Example 1. Results appear in Table 1.

Example 8

Powder was fabricated similarly to that of Example 1, except that, as the starting materials, iron nitrate ($Fe(NO_3)_3 \cdot 9H_2O$), strontium nitrate ($Sr(NO_3)_2$), zinc nitrate ($Zn(NO_3)_2 \cdot 6H_2O$), and nickel nitrate ($Ni(NO_3)_2 \cdot 6H_2O$) were used, and the materials were prepared so as to obtain a chemical composition of Fe:Sr:Zn:Ni=15.0:1.0:0.75:0.75 ($Sr_{1.0}Zn_{0.75}Ni_{0.75}Fe_{15.0}O_x$, denoted by "ZnNi—SrW" in Table 1). The powder obtained was evaluated similarly to that of Example 1. Results appear in Table 1.

Example 9

Powder was fabricated similarly to that of Example 1, except that iron nitrate ($Fe(NO_3)_3 \cdot 9H_2O$) and strontium nitrate ($Sr(NO_3)_2$) were used, and the materials were prepared so as to obtain a chemical composition of Fe:Sr=12.0:1.0 ($Sr_{1.0}Fe_{12.0}O_x$, denoted by "SrM" in Table 1 and 2). The powder obtained was evaluated similarly to that of Example 1. Results appear in Table 1.

Example 10

Powder was fabricated similarly to that of Example 1, except that iron nitrate ($Fe(NO_3)_3 \cdot 9H_2O$) and barium nitrate ($Ba(NO_3)_2$) were used, and the materials were prepared so as to obtain a chemical composition of Fe:Ba=12.0:1.0 ($Ba_{1.0}Fe_{12.0}O_x$, denoted by "BaM" in Table 1). The powder obtained was evaluated similarly to that of Example 1. Results appear in Table 1.

Example 11

Iron nitrate (Fe(NO$_3$)$_3$.9H$_2$O), strontium nitrate (Sr(NO$_3$)$_2$), lanthanum nitrate (La(NO$_3$)$_3$.6H$_2$O), and cobalt nitrate (Co(NO$_3$)$_2$.6H$_2$O) were weighed out so as to yield a chemical composition with Fe:Sr:La:Co=7.8:0.7:0.3:0.2 (La$_{0.3}$Sr$_{0.7}$Co$_{0.2}$Fe$_{7.8}$O$_x$; denoted by "LaCo" in Table 1). These starting materials were dissolved in water such that the Fe concentration was 0.2 mol/L. Next, this solution was mixed with a sodium hydroxide aqueous solution with concentration 3 mol % such that the pH was 13, and precipitate was prepared. The solution containing this precipitate was heated for two hours at 100° C., and after filtering and rinsing with water, the precipitate was separated. This precipitate was dried in air at 120° C., and crushed to obtain coprecipitate powder (precursor). Thereafter a similar procedure to that of Example 1 was used to prepare powder. The powder obtained was evaluated similarly to that of Example 1. Results appear in Table 1.

Comparison Example 1

An organic salt method was used to prepare a precursor, similarly to Example 1. Aside from causing the precursor to pass through a sieve 23 with 3 mm openings, powder was fabricated using the same procedure as in Example 1. The powder obtained was evaluated similarly to that of Example 1. Results appear in Table 2.

Comparison Example 2

An organic salt method was used to prepare a precursor, similarly to Example 1. Aside from the fact that the precursor was not caused to pass through a sieve 23, powder was fabricated using the same procedure as in Example 1. The powder obtained was evaluated similarly to that of Example 1. Results appear in Table 2.

Comparison Example 3

Powder was fabricated similarly to that of Example 1, except that the effective furnace length was approximately 1.5 m. The powder obtained was evaluated similarly to that of Example 1. Results appear in Table 2.

Comparison Example 4

Powder was fabricated similarly to that of Example 1, except that the temperature setting of each of the heaters 32 was 1300° C. The powder obtained was evaluated similarly to that of Example 1. Results appear in Table 2.

Comparison Example 5

Powder was fabricated similarly to that of Example 1, except that the temperature setting of each of the heaters 32 was 700° C. The powder obtained was evaluated similarly to that of Example 1. Results appear in Table 2.

Comparison Example 6

Precursor was fabricated similarly to Example 1. Using a horizontal-type electric furnace with normal resistive heating, the precursor was placed in an alumina boat, and with the precursor at rest, the temperature was raised by 5° C. each minute. After the temperature of the horizontal-type electric furnace reached 1000° C., the temperature was maintained for two hours, followed by cooling at 5° C. each minute. Thereafter evaluations similar to those of Example 1 were performed. Results appear in Table 2.

Comparison Example 7

Iron nitrate (Fe(NO$_3$)$_3$.9H$_2$O) and strontium nitrate (Sr(NO$_3$)$_2$) were weighed out so as to yield a chemical composition with Fe:Sr=8.0:1.0, and these starting materials were dissolved in water such that the Fe concentration was 0.2 mol/L. Next, this solution was mixed with a sodium hydroxide aqueous solution with concentration 3 mol % such that the pH was 13, and precipitate was prepared. The solution containing this precipitate was heated for two hours at 100° C., and after filtering and rinsing with water, the precipitate was separated. This precipitate was dried in air at 120° C., and crushed to obtain coprecipitate powder (precursor). Thereafter a similar procedure to that of Example 1 was used to prepare powder. The powder obtained was evaluated similarly to that of Example 1. Results appear in Table 2.

Comparison Example 8

Iron oxide (Fe$_2$O$_3$) and strontium carbonate (SrCO$_3$) were weighed out so as to yield a chemical composition with Fe:Sr=12:1. These starting materials were mixed with twice the volume of water in a ball mill for 12 hours. This solution mixture was filtered and rinsed with water, and the solid portion was separated. This separated solid portion was dried in air at 120° C., and crushed to obtain a mixed powder (precursor). Thereafter a similar procedure to that of Example 1 was used to prepare powder. The powder obtained was evaluated similarly to that of Example 1. Results appear in Table 2.

TABLE 1

| | Fabrication method | Composition | Precursor particle diameter (nm) | Sieve openings (mm) | Effective furnace length (m) | Heating temperature (° C.) | XRD results | Particle diameter (nm) | Hc (Oe) | σs (emu/g) |
|---|---|---|---|---|---|---|---|---|---|---|
| Example 1 | Organic salt | LaCo | 25 | 2 | 7 | 1000 | single M phase | 35 | 5,521 | 54 |
| Example 2 | Organic salt | LaCo | 25 | 2 | 3 | 1000 | | 32 | 2,836 | 48 |
| Example 3 | Organic salt | LaCo | 25 | 2 | 15 | 1000 | | 36 | 5,484 | 55 |
| Example 4 | Organic salt | LaCo | 25 | 0.2 | 7 | 1000 | | 33 | 5,637 | 54 |
| Example 5 | Organic salt | LaCo | 25 | 2 | 7 | 800 | | 29 | 3,242 | 49 |
| Example 6 | Organic salt | LaCo | 25 | 2 | 7 | 1200 | | 96 | 4,259 | 63 |
| Example 7 | Organic salt | LaZn | 25 | 2 | 7 | 1000 | | 31 | 5,177 | 58 |
| Example 8 | Organic salt | ZnNi—SrW | 25 | 2 | 7 | 1000 | single W phase | 32 | 3,058 | 65 |
| Example 9 | Organic salt | SrM | 25 | 2 | 7 | 1000 | single M phase | 36 | 5,521 | 50 |
| Example 10 | Organic salt | BaM | 25 | 2 | 7 | 1000 | | 37 | 5,369 | 48 |
| Example 11 | Coprecipitation | LaCo | 35 | 2 | 7 | 1000 | | 49 | 5,134 | 54 |

TABLE 2

| | Fabrication method | Composition | Precursor particle diameter (nm) | Sieve openings (mm) | Effective furnace length (m) | Heating temperature (° C.) | XRD results | Particle diameter (nm) | Hc (Oe) | σs (emu/g) |
|---|---|---|---|---|---|---|---|---|---|---|
| Comparison example 1 | Organic salt | LaCo | 25 | 3 | 7 | 1000 | M phase + S phase | 37 | 5,267 | 51 |
| Comparison example 2 | Organic salt | LaCo | 25 | none | 7 | 1000 | | 41 | 4,193 | 49 |
| Comparison example 3 | Organic salt | LaCo | 25 | 2 | 1.5 | 1000 | | 30 | 334 | 52 |
| Comparison example 4 | Organic salt | LaCo | 25 | 2 | 7 | 1300 | single M phase | 224 | 3,487 | 65 |
| Comparison example 5 | Organic salt | LaCo | 25 | 2 | 7 | 700 | M phase + S phase | 27 | 420 | 53 |
| Comparison example 6 | Organic salt | LaCo | 25 | 2 | | 1000 | single M phase | 578 | 7,396 | 56 |
| Comparison example 7 | Coprecipitation | SrM | 40 | none | 7 | 1000 | M phase + S phase | 193 | 6,272 | 44 |
| Comparison example 8 | Solid phase | SrM | 300 | none | 7 | 1000 | M phase + S phase | 365 | 1,735 | 39 |

From Table 1 and Table 2, the following facts were confirmed.

(1) When the openings of the sieve 23 were 2 mm or less (see Examples 1 and 4), no different phases (the spinel phase) were produced. On the other hand, when the openings of the sieve 23 were 3 mm (see Comparison Example 1), or when no sieve 23 was used (Comparison Examples 2 and 7), different phases were produced.

In Table 1 and Table 2, "single M phase" indicates that only the magnetoplumbite ferrite phase (M phase) was observed in XRD, and "single W phase" indicates that only the W ferrite phase was observed in XRD. Similarly, "M phase+S phase" indicates that the M phase was observed as the main phase in XRD, and in addition the spinel ferrite phase (S phase) was observed in addition to the M phase. The S phase is a different phase from the M phase.

(2) When the effective furnace length was 3 m, 7 m, and 15 m (see Examples 1 to 3 and 8), only a single phase, either the M phase or the W phase, was present. On the other hand, when the effective furnace length was 1.5 m (Comparison Example 3), a different phase (the spinel phase) was produced. When the effective furnace length was 1.5 m, the time of passage through the heating region was short, so that the precursor was not adequately heated. As a result, it is thought, a different phase was produced.

(3) When the heating temperature (temperature setting of the heaters 32) was 800° C., 1000° C., and 1200° C. (see Examples 1, 5, and 6), no different phases were produced, and the particle diameters of the particles produced (primary particle diameters) were fine, at 50 nm or less. On the other hand, when the heating temperature was 700° C. (Comparison Example 5), a different phase was produced. And, when the heating temperature was 1300° C. (Comparison Example 4), the particle diameters of the particles produced exceeded 200 nm.

(4) Even when using precursor obtained by an organic salt method, when a conventional firing method, in which the precursor was placed at rest in a tube-shape furnace and the temperature raised by 5° C./minute to 1000° C. and held for two hours, was used, the particle diameters become extremely large (Comparison Example 6). And, when precursor with large primary particles, obtained by a solid phase method, was used, even when performing the heat treatment of this invention, it was difficult to obtain fine ferrite particles (Comparison Example 8).

(5) This invention is useful for the production of ferrite particles with various compositions (Examples 7 to 10), and fine ferrite particles could be obtained without the presence of different phases, regardless of whether an organic salt method or a coprecipitation method was used (Examples 1 and 11).

Example 12

<Preparation of Coating for Magnetic Layer>

100 parts by weight of the powder obtained in Example 5 (ferrite powder, average particle diameter 29 nm), 10 parts by weight vinyl chloride (MR104 produced by Zeon Corp.), 10 parts by weight polyester urethane (UR8700 produced by Toyobo Co. Ltd.), 6 parts by weight α-$Al_2O_3$, 2 parts by weight phthalic acid, and a mixed solvent (methylethyl ketone (MEK)/toluene/cyclohexane=2/2/6 (weight ratio)) were added, the solid fraction was adjusted to 80 wt %, and kneading was performed for 2 hours. To the kneaded slurry was added a mixed solvent (MEK/toluene, cyclohexane=2/2/6 (weight ratio)), to obtain a slurry the solid fraction of which was 30 wt %. Then, in a horizontal pin mill packed with zirconia beads, dispersing processing of this slurry was performed. Thereafter, a mixed solvent (MEK/toluene/cyclohexane=2/2/6 (weight ratio)), 1 part by weight stearic acid, and 1 part by weight butyl stearate were added, to obtain a slurry the solid fraction of which was 10 wt %. To 100 parts by weight of this slurry was added 0.4 parts by weight isocyanate compound (Coronate L produced by Nippon Polyurethane Industry Co. Ltd.), to obtain a coating for a magnetic layer.

<Preparation of Lower Nonmagnetic Layer Coating>

85 parts by weight of acicular α-$Fe_2O_3$, 15 parts by weight carbon black, 15 parts by weight electron beam-cured vinyl chloride resin, 10 parts by weight electron beam-cured polyester polyurethane resin, 5 parts by weight α-$Al_2O_3$, 2 parts by weight o-phthalic acid, 10 parts by weight methylethyl ketone (MEK), 10 parts by weight toluene, and 10 parts by weight cyclohexane were placed in a pressurized kneader, and kneading was performed for 2 hours. To the kneaded slurry was added a mixed solvent (MEK/toluene/cyclohexane=2/2/6 (weight ratio)), to obtain a slurry the solid fraction of which was 30 wt %. Then, in a horizontal pin mill packed with zirconia beads, dispersing processing of this slurry was performed for 8 hours. Thereafter, a mixed solvent (MEK/toluene/cyclohexane=2/2/6 (weight ratio)), 1 part by weight stearic acid, and 1 part by weight butyl stearate were added, to obtain a slurry the solid fraction of which was 10 wt %, for use as the lower nonmagnetic layer coating.

<Preparation of Back Coat Layer Coating>

50 parts by weight of nitrocellulose, 40 parts by weight polyester polyurethane resin, 85 parts by weight carbon black, 15 parts by weight $BaSO_4$, 5 parts by weight copper oleate, and 5 parts by weight copper phthalocyanine were added to a ball mill, and dispersing was performed for 24 hours.

Then, a mixed solvent (MEK/toluene/cyclohexane=1/1/1 (weight ratio)) was added, to obtain a slurry the solid fraction of which was 10 wt %. Next, to 100 parts by weight of this slurry was added 1.1 parts by weight of an isocyanate compound, to obtain the back coat layer coating.

<Manufacture of Magnetic Tape>

On the surface of a polyethylene terephthalate film of thickness 6.1 μm, the above-described lower nonmagnetic layer coating was applied so as to have a thickness after drying of 1.0 μm. After drying, calendering was performed, and finally electron beam irradiation was performed to cure the film, forming the lower nonmagnetic layer.

Next, magnetic layer coating was applied onto the lower nonmagnetic layer such that the thickness after drying was 0.05 μm. Then, magnetic field alignment treatment was performed, followed by drying and calendering, to form the magnetic layer.

Next, the above-described back coat layer coating was applied to the rear surface of the polyethylene terephthalate film such that the thickness after drying was 0.6 μm. After drying, calendering was performed to form the back coat layer. In this way, the various layers were formed on the two surfaces to obtain unfinished magnetic tape. Thereafter, the unfinished magnetic tape was placed in an oven at 60° C. for 24 hours and heat-cured. Then the unfinished tape was cut to a width of ½ inch (12.65 mm), to obtain magnetic tape.

Comparison Example A

Ferrite powder fabricated in the same way as in Example 5, except that the heating temperature was 1300° C. (Comparison Example 4, average particle diameter 224 nm) was used. Except for the use of this ferrite powder, the same procedure as in Example 12 was used to manufacture a magnetic recording medium (magnetic tape).

<Evaluation of Electromagnetic Transducing Characteristics>

Using a drum tester and MIG head, signals recorded onto the magnetic tapes of Example 12 and of Comparison Example A at a recording wavelength of 0.2 μm. Thereafter, a GMR head was used to reproduce the recorded signals. The ratio of the output voltage of single-wave signals to the noise voltage at a separation of 1 MHz was evaluated as the C/N of the reproduced signals. When the C/N of the magnetic tape of Comparison Example A was 0 dB, the C/N of the magnetic tape of Example 12 was 3 dB, exhibiting superior electromagnetic transducing characteristics.

What is claimed is:

1. A method for manufacturing ferrite powder, comprising the steps of:
   (a) causing a ferrite precursor, obtained by a liquid-phase reaction method, to pass through a sieve with openings of 2 mm or less; and
   (b) subjecting said ferrite precursor, which has passed through said sieve, to free fall through a space at atmospheric pressure heated from 750 to 1250° C.,
   wherein in said step (b), ferrite powder, which is a single phase of hexagonal ferrite, is obtained by heating said ferrite precursor to 750-1250° C. and holding said ferrite precursor at 750-1250° C.

2. The method for manufacturing ferrite powder according to claim 1, wherein the average particle diameter of primary particles of said ferrite powder is 200 nm or less.

3. The method for manufacturing ferrite powder according to claim 1, wherein the average particle diameter of primary particles forming said ferrite precursor is 100 nm or less.

4. The method for manufacturing ferrite powder according to claim 1, wherein an air flow is induced in the direction of free fall of said ferrite precursor.

* * * * *